UNITED STATES PATENT OFFICE.

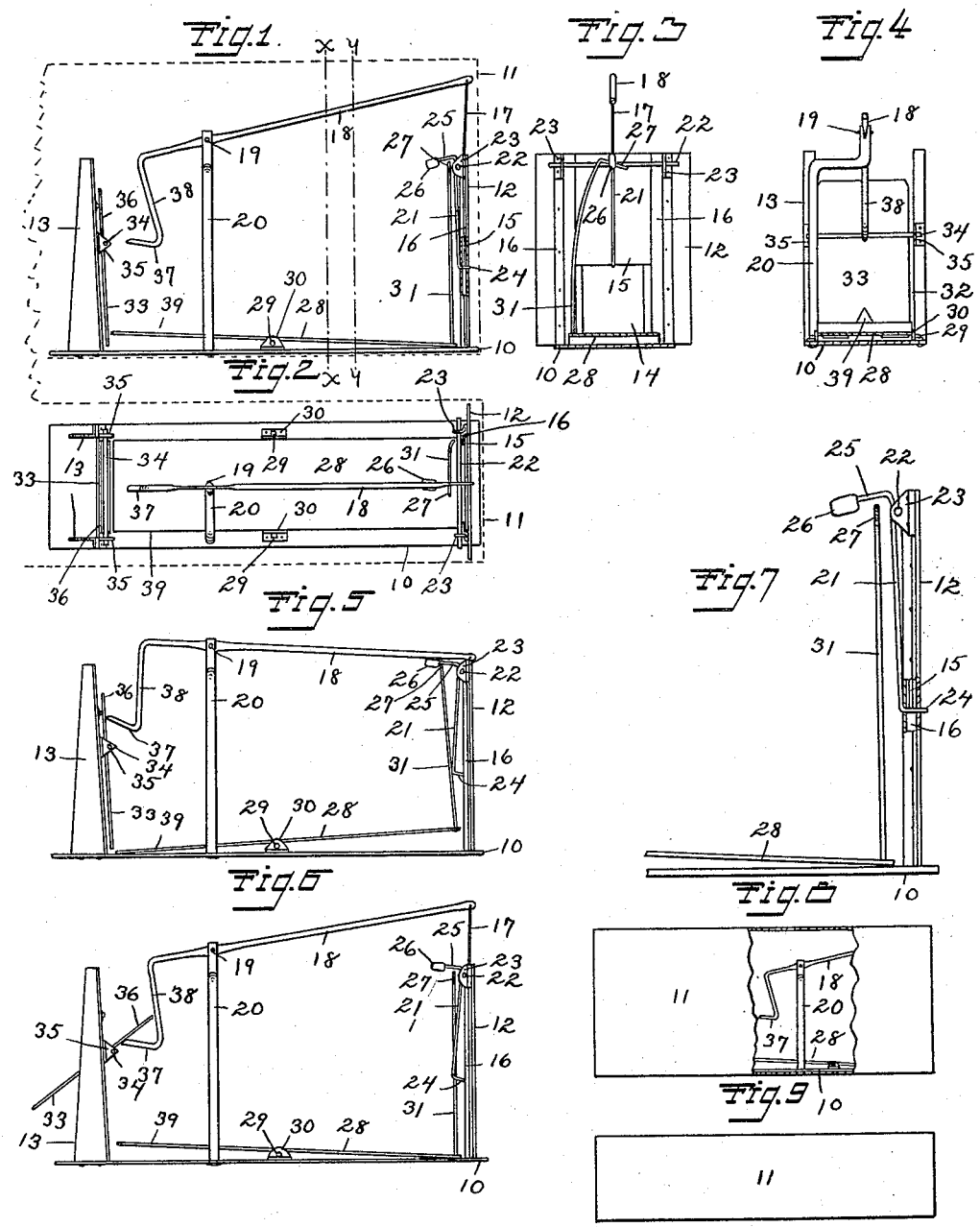

PHILIP W. LOTZ, OF EAST BERLIN, CONNECTICUT.

RAT-TRAP MECHANISM.

1,150,135.  Specification of Letters Patent.  Patented Aug. 17, 1915.

Application filed December 23, 1914. Serial No. 878,741.

*To all whom it may concern:*

Be it known that I, PHILIP W. LOTZ, a citizen of the United States, residing at East Berlin, in the county of Hartford and State of Connecticut, have invented certain new and useful Improvements in Rat-Trap Mechanism, of which the following is a specification.

My invention relates to improvements in rat trap mechanism, and the object of my improvement is simplicity and economy in construction and convenience and efficiency in use.

In the accompanying drawing:—Figure 1 is a side elevation of my improved rat trap mechanism, the box or casing being shown in broken lines. Fig. 2 is a plan view of the same. Fig. 3 is a sectional view on the line $x\ x$ of Fig. 2. Fig. 4 is a sectional view on the line $y\ y$ of Fig. 2. Figs. 5 and 6 are views corresponding to Fig. 1, showing the parts in different positions. Fig. 7 is a fragmentary view, on an enlarged scale, of certain parts shown in Fig. 1. Fig. 8 is a side elevation, in part broken out and on a reduced scale, of a housing or casing for my rat trap mechanism. Fig. 9 is a plan view of the same.

My rat trap mechanism comprises a base 10 that serves as a support for the mechanism proper, and which rests on the bottom of the casing 11, an upright wall 12 at the end corresponding to the outer end of the casing 11, and at the other or inner end a second upright wall 13.

The outer upright wall 12 is incorporated in the front wall of the casing 11 and the inner upright wall 13 is similarly incorporated in a division wall of the casing 11, and the entire mechanism mounted on the base 10 is self-contained and is adapted to be inserted into any suitable form of casing 11, it being understood that if desired the mechanism to be described may be mounted in the corresponding parts of the casing, so that a separate base 10 and upright wall portions 12 and 13 may be dispensed with.

The outer upright wall 12 is provided at the lower portion with an opening 14 that serves as an entrance controlled by a sliding door 15, engaged with ways 16 on the inner face.

A cord or wire 17 connects the sliding door 15 with the outer end of a lever arm 18.

The arm 18 is pivotally supported adjacent the middle by means of a pin 19 supported on an upright or standard 20; and serves to lift the sliding door in a manner to be described, suitably to leave the entrance 14 open.

After the sliding door 15 has been lifted a catch 21 serves to hold the same in the elevated position. The catch 21 is formed of wire, has the body portion generally vertical, is pivotally mounted adjacent the upper end by means of a shaft 22 engaged with ears 23 provided on the outer upright wall 12, has a foot 24 at the lower end formed by a right angle bend, suitable for passing under and engaging with the lower edge of the sliding door 15 and thereby supporting the same, and has at the upper end a rearwardly directed arm 25 provided with a counterweight 26. The counterweight 26 tends to bring the catch 21 into position for supporting the sliding door in the manner described, is free to do this when the same is lifted a sufficient amount, and when the sliding door is closed the tip end of the foot 24 is held against the rear face of the sliding door.

A tripping arm 27 is positioned normally adjacent the under side of the counterweight supporting arm 25, and serves when lifted to raise the same and thereby to free the catch 21 from the sliding door 15, permitting the same to close by its own weight.

Extending along the base 10 is a tripping platform 28, which is pivotally mounted adjacent the middle or slightly inwardly from the middle by means of a shaft 29 passing across the under side and engaged by its ends with ears 30 provided on the base 10.

The position of the point of pivotal support for the tripping platform 28 is such that the inner end is normally depressed and the platform itself is positioned at a slight angle to the base 10.

At the outer end of the platform 28 is an upright 31 of wire, the upper end of which is bent generally horizontally suitably to form the tripping arm 27 already mentioned. Accordingly, considering the normal position shown in Fig. 1, with the trap set, the outer end of the tilting platform 28 is depressed, the tripping arm 27 is below the counterweight supporting arm 25, and the sliding door is held in the open position by the supporting branch 24 of the catch 21.

After an animal for which the trap is adapted has passed through the entrance 14 and passed over to the inner end 39 of the tilting platform 28 the weight of the animal will tilt the same to the position shown in Fig. 5, and the catch 21 will be released from engagement with the sliding door 12, permitting the same to drop and close, thus confining the animal to the position of the casing or housing 11 in which the mechanism is positioned, and which portion serves as an entrance chamber.

The inner upright wall 13 is provided with an opening 32, controlled by a swinging door 33. The said swinging door 33 is pivotally supported by means of a shaft 34, engaged by its ends with ears 35, provided on the inner upright wall 13, positioned adjacent the upper portion of the opening 32. The swinging door 33 is of suitable width to permit the same to swing inwardly through the door space or opening 32, as shown in Fig. 6, the lower end of the same is opposed to the free end 39 of the tilting platform 28, suitably to prevent the same from being opened outwardly as shown in Fig. 1, and the same has an upward extension 36.

The lower portion of the swinging door 32 has an opening 39 that serves as a sight hole, so that the animal can see from the entrance chamber into the receiving chamber, the admission to which is controlled by the swinging door 33, and in which there may be provided bait in any suitable manner, and preferably confined and protected so that the animal will be unable to really have access thereto. The upper end 36 of the swinging door 33 serves to open the sliding door 15 and thus reset the trap after the animal has pushed the swinging door 33 open and passed to the inner side thereof, and does this in the following manner. After the animal has tilted the platform 28 and closed the sliding door 15 the parts are in the position shown in Fig. 5, in which the extension 36 is engaged with the tip end of the inner end 37 of the lever 18. The said inner end 37 is in the form of a hook, being connected to the body portion of the lever 18 by a generally vertical branch 38, the lever 18 being virtually in the form of a bell-crank. Swinging the lower portion of the swinging door 33 inwardly serves to swing the upper extension 36 thereof outwardly, as shown in Fig. 7, and serves to raise the outer end of the lever 18, suitably to raise the sliding door 15, and permit the catch 21 to engage therewith. Accordingly, the animal in passing through the swinging door 33 serves to reset the trap.

A small amount of bait may be spread over the tilting platform 28 if desired.

It will be noted that a small movement of the tilting platform serves to confine the animal in the entrance chamber. The animal after being confined in the entrance chamber will seek an outlet, and will be enticed by the small opening 39 in the swinging door 33 to seek an outlet by way of the swinging door.

It is apparent that some changes from the specific construction herein disclosed may be made and therefore I do not wish to be understood as limiting myself to the precise form of construction shown and described, but desire the liberty to make such changes, in working my invention, as may fairly come within the spirit and scope of the same.

I claim as my invention:—

1. Rat trap mechanism comprising an end wall having an entrance, a division wall having an opening, a tilting platform located between the said walls and normally positioned in one position, a sliding door controlling the said entrance, a swinging door controlling the said opening and normally closed, a catch normally engaged with the said sliding door to hold it in the open position, means on the said platform operative when the same is tilted from the said normal position to release the said catch and the said catch comprising a swinging arm having a pivotal support, and positioned at the rear of the said sliding door, having a pendent portion extending downwardly from the said pivotal support, and a forwardly directed branch at the lower end of the said pendent portion, serving as the catch proper, and operative to engage by its tip end with the rear face of the said sliding door and for passing under the said sliding door into position for supporting the same, and having a weight arm extending rearwardly from the said pivotal support, and a weight supported thereby.

2. Rat trap mechanism comprising an end wall having an entrance, a division wall having an opening, a tilting platform located between the said walls and normally positioned in one position, a sliding door controlling the said entrance, a swinging door controlling the said opening and normally closed, a catch normally engaged with the said sliding door to hold it in the open position, means on the said platform operative when the same is tilted from the said normal position to release the said catch, and means operative when the said swinging door is swung inwardly to raise the said sliding door to position of engagement with the said catch, comprising in combination an upward extension of the said swinging door above the pivotal support therefor, a lever pivotally supported and having the front end flexibly connected to the said sliding door, and the rear arm portion of the said lever comprising a free end in the line of movement of the said extension and engaged thereby when the said swinging door is moved in one direction.

PHILIP W. LOTZ.

Witnesses:
S. E. ROBINS,
M. POLLARD.

Copies of this patent may be obtained for five cents each, by addressing the "Commissioner of Patents, Washington, D. C."